UNITED STATES PATENT OFFICE.

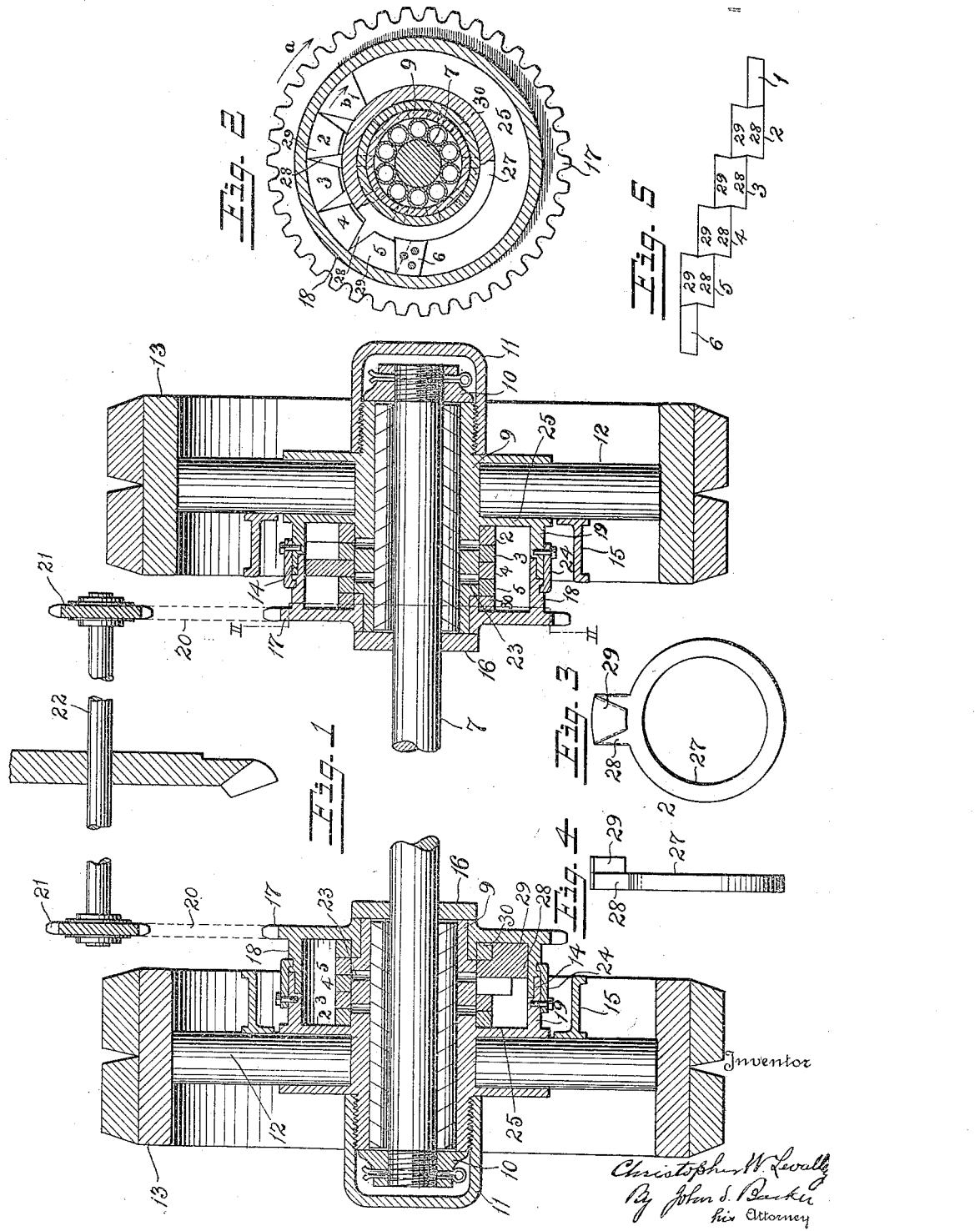

CHRISTOPHER W. LEVALLEY, OF MILWAUKEE, WISCONSIN.

TRANSMISSION-GEARING.

1,194,301.

Specification of Letters Patent.

Patented Aug. 8, 1916.

Application filed October 7, 1915. Serial No. 54,600.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Transmission-Gearing, of which the following is a specification.

My invention relates to transmission gearing, particularly to the type adapted for use with motor driven vehicles such as are employed for commercial purposes where the two traction wheels are driven through separate chain or gearing connections from a common motor driven countershaft.

The invention has for its object to improve gearing of this type adapting it to drive both wheels together, or either independently, and when doing the latter to permit the faster moving wheel, as the outer one when the vehicle is turning, to run freely and to become disconnected from the power shaft.

In the accompanying drawings—Figure 1 is a transverse sectional view through one of the driven traction wheels of a motor truck provided with my invention. Fig. 2 is a cross sectional view taken on the line II—II of Fig. 1. Figs. 3 and 4 illustrate respectively in side elevation and edge view one of the floating coupling members. Fig. 5 is a diagrammatic view illustrating in plane development the connecting members between the driving and the driven parts through which motion is transmitted from one to the other.

In the drawings, 22 designates a power driven shaft, such as the countershaft of a motor vehicle. It is suitably supported, though its supports are not shown, and carries pinions, 21, sprocket wheels being the form of pinions here illustrated. Power is transmitted from this shaft through connecting belts 20 that engage with sprocket wheels 17 mounted loosely upon the hubs 9 of the ground or traction wheels of the vehicle. These wheels may be of any suitable or desired form being represented as having spokes 12 and rims 13, to which latter are secured suitable tires. The wheels are supported upon a shaft or axle 7, suitable antifriction roller bearing being interposed between this shaft and the hubs 9 of the wheel. To the spokes of each wheel is secured a brake drum 15. Each wheel is confined in its place upon the shaft 7 by a collar 16 secured to the shaft and against which the inner end of the hub abuts, and a confining nut 10 secured to the end of the shaft and bearing against the other end of the hub. A cap 11 is screwed onto the hub and covers the end of the axle and the confining nut 10, and, if desired, serves to form a lubricant chamber. These elements of the apparatus form no essential part of my invention, all being well known in the art, and may therefore be modified in form and arrangement as circumstances may suggest or dictate.

The sprocket wheel 17, which may be termed the drive gear, is formed with an annular flange 18 extending toward the wheel and preferably concentric with the hub 9 and the axle 7. Another flange, 19, is carried by the wheel, extending from the hub thereof toward the sprocket wheel 17; and the two flanges 18 and 19 together constitute a closed chamber concentric with the hub of the wheel, the edges of the flanges being formed to constitute a rabbet joint 14 where they meet. To hold these two flanges together I preferably employ some form of connecting means, such as the keepers 24, secured fast to one of the flanges and having their toes or inwardly projecting ends set into an annular groove formed in the other flange. The chamber inclosed by the sprocket wheel 17, flanges 18 and 19, and the web 25 of the hub, serves as a grease chamber or receptacle, the hub 9 being perforated, as indicated at 23, to permit the passage of lubricant from this chamber to the axle 7. Within this chamber are also arranged the parts constituting the clutch or coupling connections between the drive wheel 17 and the driven wheel. These coupling parts are designated respectively 1, 2, 3, 4, 5 and 6, the first of this series as designated being secured fast to or made a part of, the driven wheel or member, and the last of the series being secured fast to, or made a part of, the drive wheel or member. The coupling element 1 is a block, preferably of tapering or wedge shape, secured fast to the web 25 of the hub of the traction wheel, while the opposite one of the series, 6, is also a block, preferably of wedge shape, secured to the face of the sprocket wheel 17. These projections, 1 and 6, although they extend toward each other, are yet some distance apart, and travel in different planes. Between them are arranged a series of independent, connecting members, loosely supported so as to turn about the same axis of revolution as do the driving and the driven wheels, the hub 9 of the driven wheel preferably serving as the supporting bearing for them. They are duplicates of each other and are designated 2, 3, 4 and 5, respectively. Each of these consists of a supporting ring 27, an arm 28 extending out radially therefrom, and a laterally disposed projection 29 secured to one face of the arm 28.

The lateral projection 29 of each independently movable connecting member overlaps the arm 28 of its neighboring connecting member, and the opposite faces of the arms are in such planes and are finished at such angles as to be engaged by the edges of the lateral projections 29 when the parts of the clutch or coupling are brought into driving relationship as indicated in Fig. 2. Thus the projection or block 1 carried by the driven wheel engages with the arm 28 of the first loose, free or floating coupling member 2; the lateral projection 29 of the latter engages with the arm 28 of the floating coupling member 3, the lateral projection of the latter with the arm of the floating coupling member 4, and so on until the end of the series, where the projection 29 of the arm 28 of the last free member is in engagement with the fixed driving block or lateral projection 6 of the drive wheel.

Each lateral projection is preferably formed with opposite converging edges disposed in such angular relationship to each other as to properly engage with the edges of the arm 28 with which it works, when the edges or working faces of this latter are parallel with each other and with a radial line passing centrally through the arm; although the relationship of the angles of the working engaging faces of these parts might be different from that shown if preferred. It will be seen by reference to Fig. 5 that the working or engaging faces formed by the edges of the projection 29 are at an angle to the adjacent working or engaging edges of the arm that carries such projection, the angles formed by the meeting of these edges being reëntrant angles. This arrangement, as is evident from an inspection of Fig. 5, causes the parts when in driving engagement to be drawn toward each other, on lines parallel with the axis of revolution about which the parts turn, rather than to be forced apart.

30 indicates a spacing ring similar in size to one of the rings 27 of the independent floating members 2, 3, 4 and 5 of the coupling. It is used to fill up the space between the wheel 17 and the web 25 of the driven wheel not occupied by the rings 27.

It will be understood that the parts described are duplicated for each wheel.

The operation of the apparatus may now be set forth. Let it be supposed that the main drive gear 17 of each wheel is being driven in the direction indicated by the arrow $a$ in Fig. 2. The driving piece 6 carried thereby, in the course of its revolution, comes into engagement with one face of the lateral projection 29 of the coupling member 5, causing the latter to revolve with it. The arm 28 of this part 5 in turn comes into engagement with the lateral projection 29 of the floating coupling piece 4 and causes the revolution of the latter; and in this way the several loose or floating coupling members are successively picked up and driven in a forward direction until the arm of the last one, 2, comes into engagement with the projection 1 which is fast to the driven wheel. When this occurs motion will be imparted from the driving to the driven wheel through the set of connections designated respectively 6, 5, 4, 3, 2 and 1.

Under ordinary conditions, as when a motor vehicle is being driven along a straight course, the parts of the transmission gear are in the positions indicated in Fig. 2 for both wheels, which are therefore driven together and at the same speed. Should, however, one of the wheels speed up, as would be the case with the outer wheel when a vehicle takes a curved course, then the fixed coupling member 1 that is secured to the faster running wheel moves ahead of the other parts of the coupling, in the direction of the arrow $b$, Fig. 2, and is thus taken out of driving connection with the gear 17; and hence the vehicle is now driven only through the other, the more slowly turning, wheel.

With apparatus such as described one of the traction wheels may run faster than the other for a considerable distance, without coming into reverse coupling connection with the drive gear; for, when the fixed coupling member 1 begins to advance in the direction of the arrow $b$, it will make nearly a complete independent revolution before it comes into engagement with the projection 29 of the first loose coupling member, 2, engaging the arm 28 thereof on that side which is opposite to the one with which it was engaged when in forward driving relation and before the wheel began to speed up. When the fixed coupling member 1 thus engages the floating coupling member 2, it picks up the latter and carries it away from engagement with the floating coupling member 3 at the greater speed of the fast running wheel, and then nearly another complete independent revolution must be gained by the fast running wheel before the second floating coupling member is picked up from the rear and carried away from engagement with the third coupling member 4. This successive picking up and carrying forward of the free or floating coupling members is carried on throughout the series until finally the last one of the series, 5, engages with the rear face of the projection 6, when the parts come into reverse or rear driving relationship. However, this amount of overrunning of the faster turning wheel would probably never occur in practice.

It is evident from an inspection of the drawings that the mechanism described is equally will adapted for reverse as for forward driving.

It will be seen that the several members of the coupling or clutch connection between the driving and the driven members comprise a set of independent revolving connections arranged in a lateral stepped relation to each other, each overlapping and engaging with the next in succession; and of which the intermediate connections are free to rotate independently of each other and of either the driving or the driven element, each intermediate element being arranged to be driven by a preceding element of the series and to act as the driver for the succeeding element thereof. It should be recognized that each series of connections is of itself a complete organization, and under some conditions might be used without a corresponding set of connections for a second driven wheel or shaft being employed therewith. The number of intermediate floating coupling members here shown is not arbitrary, but may be increased or diminished without departing from the principle of the invention.

I do not in this case claim the combination in a transmission gear for driving the more slowly turning of a pair of driven shafts, of a contact member carried by one of the shafts, a projecting contact member carried by the driving gear and a floating intermediate connecting member between these two and free to turn about the axis of rotation of the drive gear, independently, to a limited degree, of both the driving and the driven parts, between which it is located, as this subject matter is described, illustrated and claimed in a copending application filed by me on the 14th day of July, 1915, No. 39,844; nor do I claim the combination, in such transmission gearing as just referred to, of a projection carried by the drive gear, means fixedly connected with one of the driven members through which the latter is driven, and floating connections supported so as to be free to rotate about the axis of rotation of the driven member and disposed between the latter and the drive gear and arranged to be driven by the drive gear and to drive the said driven member, and also free to rotate with the driven member and relative to the drive gear when the former rotates at a speed greater than that at which the drive gear tends to rotate it, as this subject matter is described, illustrated and claimed, in a copending application filed by me on the 6th day of April, 1915, Serial No. 19,495.

What I claim is:—

1. In a transmission gearing, the combination of a drive gear, a driven element formed with a web substantially parallel with the drive gear, flanges extending respectively from the said drive gear and web of the driven part, the edges of the said flanges abutting and together forming a closed annular chamber, and coupling devices between the drive gear and the driven part located in the said chamber.

2. In a transmission gearing, the combination of a drive gear, a wheel driven thereby, a shaft by which said gear and wheel are supported and about which they turn, an annular flange carried by the drive gear and extending toward the driven wheel, an annular flange carried by the driven wheel and extending toward the drive gear, the edges of the said flanges meeting and forming a close joint, and coupling devices between the drive gear and the driven wheel located in the chamber inclosed by the said flanges.

3. In a transmission gearing, the combination of a driven wheel, a shaft by which the wheel is supported and about which it turns, a drive gear coaxial with the driven wheel, a set of revolving connecting members between the drive gear and the driven wheel arranged in lateral stepped relation to each other, each overlapping and engaging with the next in succession, the intermediate members of the set being free to rotate independently of each other and of the driving and driven elements and each intermediate connection being arranged to be driven by a preceding one of the series and to act as a driver for a succeeding one, and a casing concentric with the axis of the said supporting shaft and carried by the said drive gear and driven wheel, inclosing a chamber in which are located the said connecting members.

4. In a transmission gearing, the combination of a shaft, a wheel supported thereby, a drive gear supported loosely upon the hub of the wheel which acts as a supporting bearing therefor, a set of independent loose power transmitting devices supported upon the hub of the driven wheel and constituting driving connections between the drive gear and the latter, the connections being arranged to permit the driven wheel to overrun and thereby interrupt its driving connection.

5. In a transmission gearing, the combination of a pair of driven wheels, a pair of drive gears coaxial with the driven wheels, a drive shaft, driving gear connections between the shaft and the said drive wheels independent driving connections between each drive gear and driven wheel consisting of a set of connecting members arranged in lateral stepped relation to each other, the intermediate connections being loose and independently supported and arranged to permit the driven wheel to overrun and temporarily break its connection with the drive shaft.

6. In a transmission gearing, the combination of a drive gear, a driven member coaxial therewith, and a set of revolving driving connections between these arranged in lateral stepped relation to each other, the intermediate members of such set being free to revolve to a limited extent independently of the members connected respectively with the driving and the driven parts, and the engaging, co-acting faces of such driving connecting parts being in the form of re-entrant angles, whereby when in working relation the said driving parts are drawn toward each other substantially as set forth.

CHRISTOPHER W. LEVALLEY.

Witnesses:
J. D. SARGENT,
GEO. B. WELSER, Jr.

Copies of this patent may be obtained for five cents each, by addressing the "Commissioner of Patents, Washington, D. C."